(12) United States Patent
Best et al.

(10) Patent No.: US 8,527,260 B2
(45) Date of Patent: Sep. 3, 2013

(54) USER-CONFIGURABLE TRANSLATIONS FOR ELECTRONIC DOCUMENTS

(75) Inventors: Steven F. Best, Georgetown, TX (US); Robert J. Eggers, Jr., Austin, TX (US); Janice M. Girouard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1387 days.

(21) Appl. No.: 11/850,876

(22) Filed: Sep. 6, 2007

(65) Prior Publication Data
US 2009/0070094 A1 Mar. 12, 2009

(51) Int. Cl.
G06F 17/28 (2006.01)
G06F 17/20 (2006.01)

(52) U.S. Cl.
USPC .................................... 704/5; 704/3; 704/8

(58) Field of Classification Search
USPC ........................................................ 704/5
See application file for complete search history.

(56) References Cited

U.S. PATENT DOCUMENTS

| | | | |
|---|---|---|---|
| 4,393,460 A * | 7/1983 | Masuzawa et al. | 704/3 |
| 5,091,876 A * | 2/1992 | Kumano et al. | 704/3 |
| 5,349,368 A * | 9/1994 | Takeda et al. | 345/684 |
| 5,822,720 A * | 10/1998 | Bookman et al. | 704/3 |
| 6,119,077 A * | 9/2000 | Shinozaki | 704/3 |
| 6,623,529 B1 * | 9/2003 | Lakritz | 715/205 |
| 7,085,707 B2 * | 8/2006 | Milner | 704/5 |
| 7,177,793 B2 | 2/2007 | Barker et al. | |
| 7,200,812 B2 * | 4/2007 | Light et al. | 715/271 |
| 7,346,487 B2 * | 3/2008 | Li | 704/2 |
| 7,493,250 B2 * | 2/2009 | Hecht et al. | 704/3 |
| 2002/0152064 A1 * | 10/2002 | Dutta et al. | 704/9 |
| 2002/0165707 A1 | 11/2002 | Call | |
| 2003/0009320 A1 * | 1/2003 | Furuta | 704/2 |
| 2003/0115552 A1 | 6/2003 | Jahnke et al. | |
| 2003/0160830 A1 | 8/2003 | DeGross | |
| 2003/0203343 A1 | 10/2003 | Milner | |
| 2005/0197826 A1 | 9/2005 | Neeman | |

* cited by examiner

*Primary Examiner* — Jesse Pullias
(74) *Attorney, Agent, or Firm* — Kolisch Hartwell, PC; Steven L. Bennett

(57) ABSTRACT

Generally speaking, systems, methods and media for selectively modifying an electronic document by restoring user-selected portions of translated electronic document text to their original language are disclosed. Embodiments of a method for selectively modifying an electronic document may include receiving a request from a user to view a user selection of text of an electronic document in an original language instead of a second translated language where the electronic document has substantially all of its text in the second translated language. Embodiments may also include analyzing the request to determine an expanded selection to be changed into original replacement language. Embodiments may also include determining original replacement language associated with the determined expanded selection, selectively modifying the electronic document by permanently replacing text of the electronic document in the second translated language with text in the associated original replacement language, and storing the modified electronic document.

22 Claims, 6 Drawing Sheets

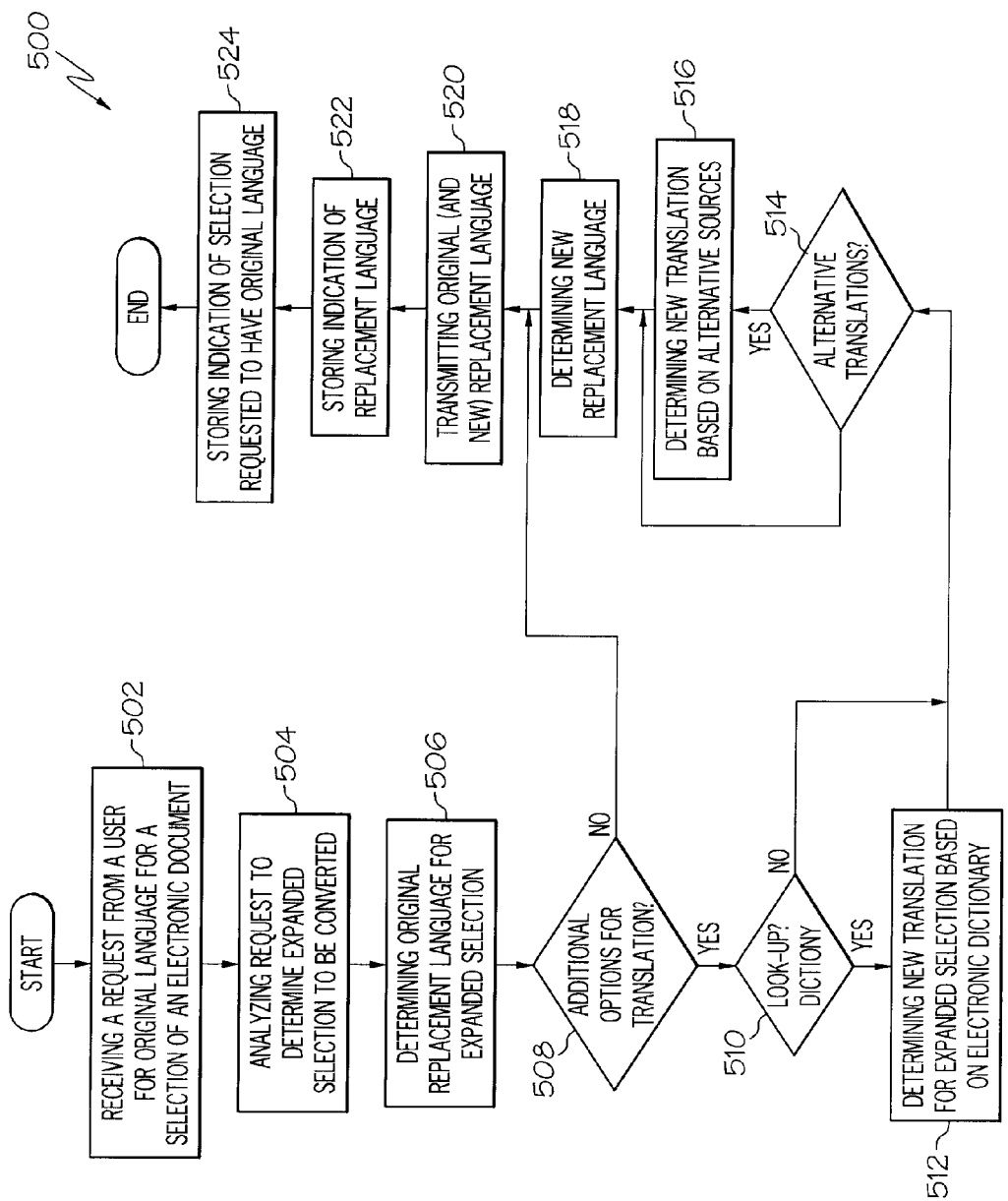

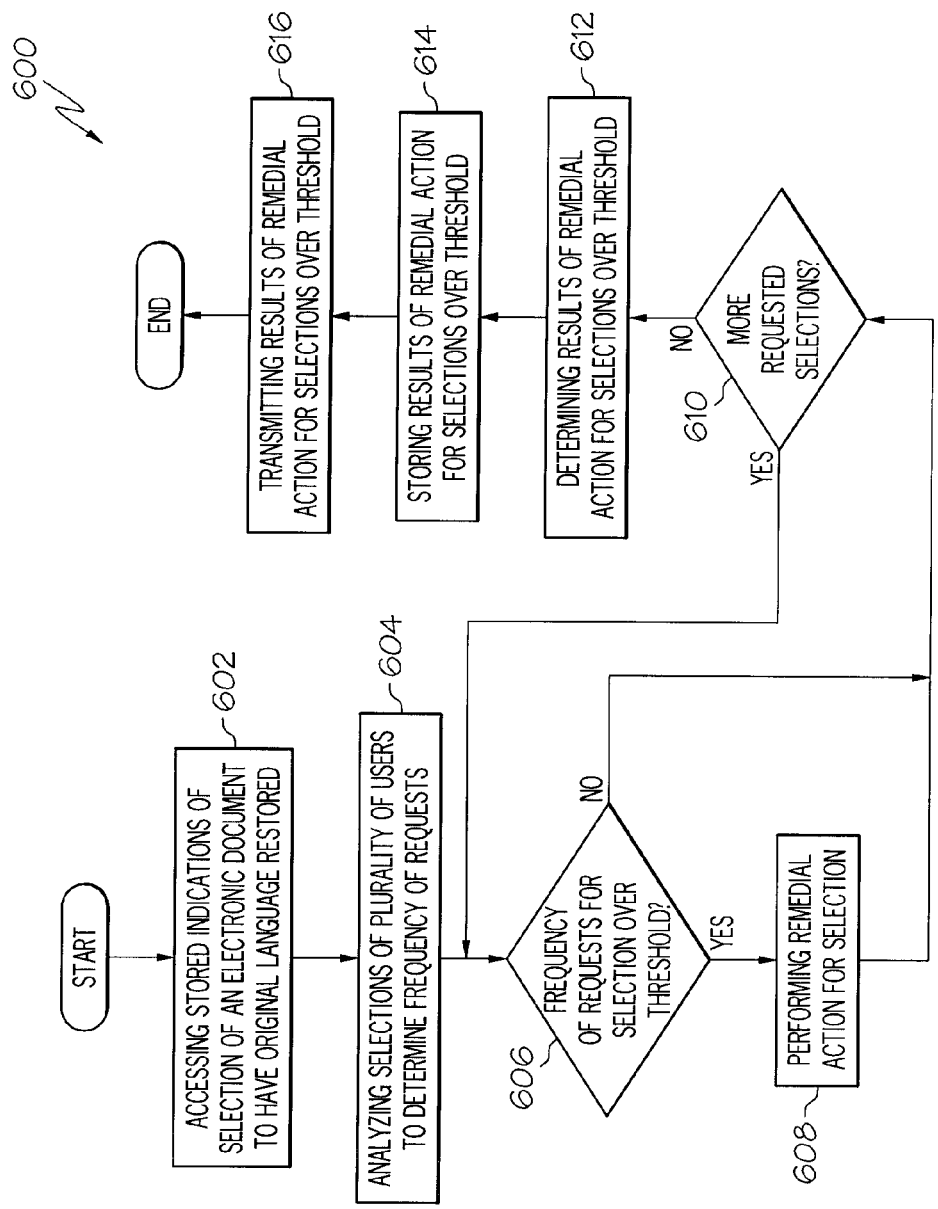

USER-CONFIGURABLE TRANSLATIONS FOR ELECTRONIC DOCUMENTS

FIELD OF INVENTION

The present invention is in the field of data processing systems and, in particular, to systems, methods and media for selectively modifying an electronic document by restoring user-selected portions of translated electronic document text to their original language.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings.

One application for computer systems that is increasing in importance is the creation, dissemination, and viewing of electronic documents, such as electronic books or articles. When compared to traditional media, electronic documents provide significant benefits in terms of the cost and speed of distribution as well as providing other benefits such as the ability to quickly provide updates. As technology continues to advance, the benefits of electronic documents over traditional paper-based media will likely become more pronounced while their disadvantages become lessened. Electronic documents are thus an increasingly attractive alternative or addition to traditional distribution methods for publishers of books, magazines, articles, and other texts.

One type of book that is particularly popular for electronic distribution is technical books because of their time-critical nature and often technologically savvy readers. Publishers are typically electronically distributing technical books by either providing them via download or by offering them on-line in a fashion accessible by subscribers or others who have paid for the book. By providing technical books electronically, publishers are able to provide additional services as well, such as by providing example files, downloadable sample code, or other benefits. Another additional service increasingly popular with publishers is the availability of translations of the electronic book into other languages. Readers may then purchase or license the book in whatever language they desire. Translation of technical books into a multitude of languages may thus provide additional sales and marketing benefits to publishers.

The often time-critical nature of technical books, however, often results in translations that are rushed and are therefore often incorrect, incomplete, or poorly worded. Moreover, the content of technical books is often difficult to translate because of its complexity and the potential lack of an equivalent word in other languages. As a result of the problems in translation, many potential buyers are deterred from purchasing a translated electronic book and sales of translated technical books are often lower than publishers are expecting or desire. Many technical professionals, for example, purchase the version of the book printed in its original language (often English) instead of their native language and rely on an often inadequate command of the original language to muddle through the book. Such a solution results in a reader who struggles with the book that they would rather read in their native language, resulting in wasted time and an unhappy customer. Other readers refrain from purchasing the electronic book at all as there is no solution that provides a clear, readable text in the language they prefer.

SUMMARY OF THE INVENTION

The problems identified above are in large part addressed by systems, methods and media for selectively modifying an electronic document by restoring user-selected portions of translated electronic document text to their original language. Embodiments of a method for selectively modifying an electronic document may include receiving a request from a user to view a user selection of text of an electronic document in an original language instead of a second translated language where the electronic document has substantially all of its text in the second translated language. Embodiments may also include analyzing the request to determine an expanded selection to be changed into original replacement language where the expanded selection includes at least the user selection. Embodiments may also include determining original replacement language associated with the determined expanded selection and selectively modifying the electronic document by permanently replacing text of the electronic document in the second translated language with text in the associated original replacement language. Embodiments may also include storing the modified electronic document.

Another embodiment provides a computer program product comprising a computer-useable medium having a computer readable program wherein the computer readable program, when executed on a computer, causes the computer to perform a series of operations for selectively modifying an electronic document. The series of operations generally includes receiving a request from a user to view a user selection of text of an electronic document in an original language instead of a second translated language where the electronic document has substantially all of its text in the second translated language. Embodiments may also include a series of operations for analyzing the request to determine an expanded selection to be changed into original replacement language where the expanded selection includes at least the user selection. Embodiments may also include a series of operations for determining original replacement language associated with the determined expanded selection and selectively modifying the electronic document by permanently replacing text of the electronic document in the second translated language with text in the associated original replacement language. Embodiments may also include a series of operations for storing the modified electronic document.

A further embodiment provides an electronic document translation system for executing a computer program to selectively modify an electronic document. The system may include a one or more memory devices storing the computer program and one or more processors to execute the computer program. Embodiments of the computer program may include an electronic document database storing an electronic document and an indication of original language for text of the electronic document, where the electronic document has substantially all of its text in a second translated language. Embodiments of the computer program may also include a user interface to receive a request from a user to modify a user selection of text to be in the original language instead of the second translated language. Embodiments of the computer program may also include a document converter to determine original placement language associated with the user selection and to selectively modify the electronic document by permanently replacing electronic document text in the second translated language with text in the original language.

BRIEF DESCRIPTION OF THE DRAWINGS

Aspects of certain embodiments of the invention will become apparent upon reading the following detailed description and upon reference to the accompanying drawings in which like references may indicate similar elements:

FIG. 5 depicts an example of a flow chart for receiving and processing a request for a selective modification to a translated electronic document according to some embodiments; and FIG. 6 depicts an example of a flow chart for analyzing user selections of text to be converted to original language according to some embodiments.

DETAILED DESCRIPTION OF EMBODIMENTS

Figure 1:
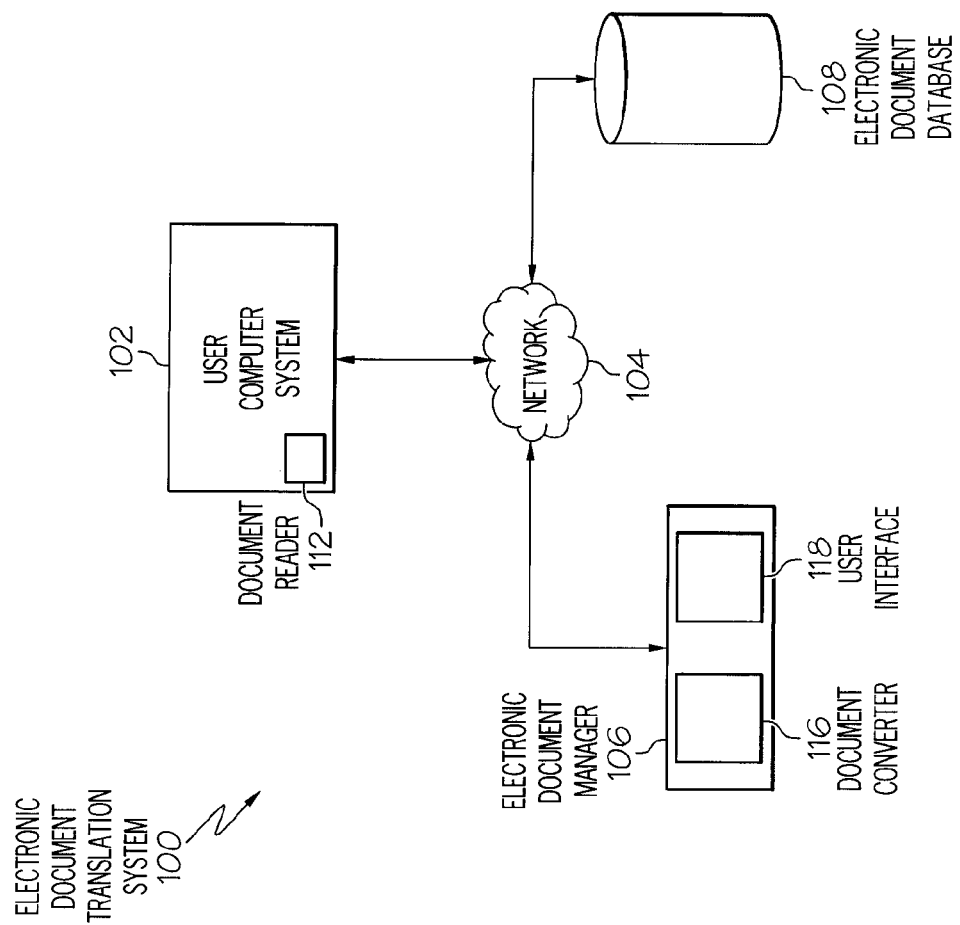
FIG. 1 depicts an environment for an electronic document translation system with an electronic document manager, user computer system, and electronic document database according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims.

Generally speaking, systems, methods and media for selectively modifying an electronic document by restoring user-selected portions of translated electronic document text to their original language are disclosed. Embodiments of a method for selectively modifying an electronic document may include receiving a request from a user to view a user selection of text of an electronic document in an original language instead of a second translated language where the electronic document has substantially all of its text in the second translated language. Embodiments may also include analyzing the request to determine an expanded selection to be changed into original replacement language where the expanded selection includes at least the user selection. Embodiments may also include determining original replacement language associated with the determined expanded selection and selectively modifying the electronic document by permanently replacing text of the electronic document in the second translated language with text in the associated original replacement language. Embodiments may also include storing the modified electronic document.

The system and methodology of the disclosed embodiments allows for effective and efficient configuration of translations on an electronic document by a user. By using the disclosed system, a reader may purchase an electronic document with translated text in the reader's native language, thus allowing the reader to easily read the translated document in the language in which they are most comfortable. At any point the reader may, however, select a portion of the text and request that the selection be permanently replaced in the electronic document with the original, un-translated text. This allows a reader to revert back to the original text only when the reader needs to for clarity. A reader, for example, that is having trouble with a paragraph of translated text may request for the original language to replace that paragraph and that reader may be able to more easily understand the new text. This ability may be particularly useful for electronic documents that have been hastily translated or for which translation is difficult, and provides the ability for the reader to choose the language they desire for text at any level of selection. The permanent replacement of the text also facilitates repeated viewing as the next time a reader accesses the document the text will be in the combination of languages that they prefer.

In general, the routines executed to implement the embodiments of the invention, may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for an electronic document translation system with an electronic document manager, user computer system, and electronic document database according to some embodiments. In the depicted embodiment, the electronic document translation system 100 includes a user computer system 102, an electronic document manager 106, and an electronic document database 108 in communication via network 104. As will be described in more detail subsequently, the electronic document translation system 100 allows readers of a translated electronic document to selectively replace portions of the electronic document with the original, un-translated text, providing a mechanism for the user to configure the electronic document to have the combination of languages the user desires.

A user may utilize a user computer system 102 according to the present embodiments to facilitate reading an electronic document and configuring the translations of the electronic document. User computer system 102 may be a personal computer system or other computer system adapted to execute computer programs, such as a personal computer, workstation, server, notebook or laptop computer, desktop computer, personal digital assistant (PDA), mobile phone, wireless device, or set-top box. A user may interact with the user computer system 102 via a user interface to, for example, request access to an electronic document or to select text of an open electronic document to convert to its original language. User computer system 102 may be in communication with network 104 for transmitting and receiving information.

Figure 4:
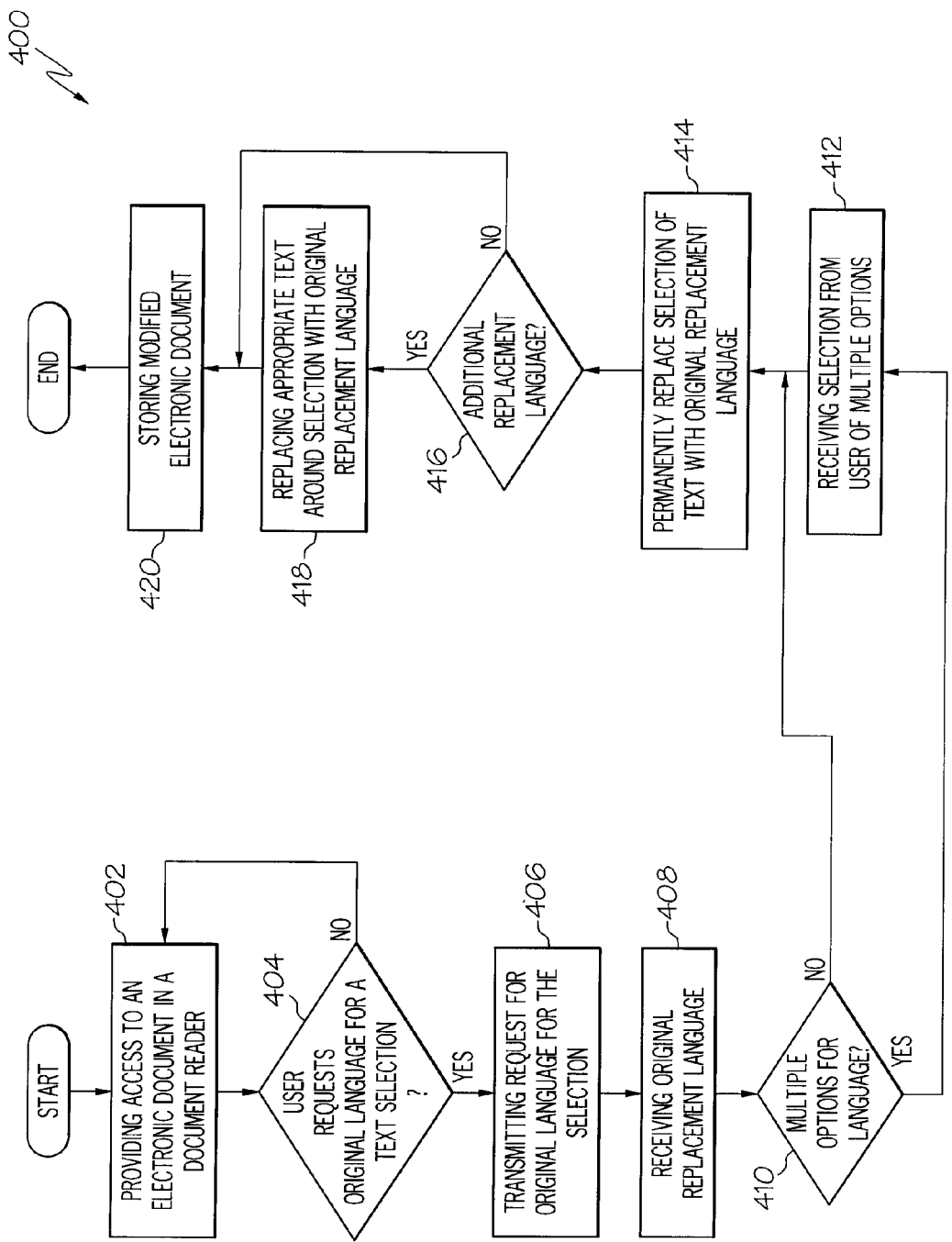
FIG. 4 depicts an example of a flow chart for requesting a selective modification to a translated electronic document according to some embodiments.

The user computer system 102 may include a document reader 112 to facilitate access, reading, and configuring of an electronic document, as described in more detail in relation to FIG. 4. Document reader 112 may include any application adapted to allow a reader to read or otherwise access an electronic document. A user may interact with the document reader 112 via user input devices of the user computer system 102 such as a mouse, keyboard, voice input device, etc., as will be described in more detail subsequently. In some embodiments, document reader 112 may be a dedicated electronic document program such as the Adobe® Acrobat® family of software from Adobe Systems Inc., which provides access to documents in formats such as Portable Document Format (PDF). In other embodiments, document reader 112 may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc. A browser-based document reader 112 may be used, for example, by a user to access electronic documents in HyperText Markup Language (HTML) or other formats.

Document reader 112 may either be a dedicated program designed to facilitate operation of the disclosed embodiments or, alternatively, the functionality of the disclosed embodiments may be added to an existing document reader 112. The added functionality of the disclosed embodiments may include receiving a user selection of text, receiving a request to permanently revert the text to its original language, displaying the modified electronic document, or other functions. Functionality may be added to a document reader 112 in any fashion, such as by downloadable update, installed plug-in, embedded JavaScript™ (of Sun Microsystems, Inc.) or other code integrated into a browser page, Asynchronous JavaScript And XML (AJAX) (also known as XMLHTTP)-based techniques. One of ordinary skill in the art will recognize that other techniques, scripting languages or methodologies may also be utilized with the disclosed system.

Network 104 may be any type of data communications channel or combination of channels, such as the Internet, an intranet, a LAN, a WAN, an Ethernet network, a wireless network, telephone network, a proprietary network, or a broadband cable network. In one example, the Internet may be particularly useful as a network 104 between a user computer system 102 and an electronic document manager 106 that is serving a plurality of user with on-line electronic documents. Those skilled in the art will recognize, however, that the invention described herein may be implemented utilizing any type or combination of data communications channel(s) without departure from the scope and spirit of the invention.

The electronic document manager 106 may receive and process requests to configure the translations of an electronic document for a particular user, as will be described in more detail in relation to FIG. 3. The electronic document itself may typically have substantially all of its text in a different language from the original language for the document. The translation from the original language to the second, different language may be accomplished in any fashion, such as by human translation, machine translation, dictionary look-ups, etc. The electronic document manager 106 may include a document converter 116 and a user interface 118. The user interface 118 may receive a request from a user to modify a user selection of text to be in the original language instead of the translated language. The document converter 116 may determine original replacement language associated with the user selection by accessing, for example, a file containing an indication of the original language of the electronic document. The document converter 116 may also selectively modify the electronic document by permanently replacing electronic document text in the second translated language with text in the original language.

The electronic document database 108 may store one or more translated electronic documents as well as indications of the original language for those electronic documents. In some embodiments, the electronic document database 108 may also store modified electronic documents that have been modified consistent with user-requested configurations (i.e., with some translated text replaced with original language text). The electronic document database 108 may include any type or combination of storage devices, including volatile or non-volatile storage such as hard drives, storage area networks, memory, fixed or removable storage, or other storage devices. The electronic document database 108 may be located in a variety of positions within the electronic document translation system 100, such as being a stand-alone component, part of the user computer system 102, or part of the electronic document manager 106.

One of ordinary skill in the art will recognize that the electronic document translation system 100 may be configured in a variety of fashions. In some embodiments, for example, the electronic document manager 106 and electronic document database 108 may be located on the user computer system 102, such as being integrated with the document reader 112. These embodiments may represent a stand-alone application to manage electronic documents as well as selectively revert to original text according to the disclosed embodiments. In other example embodiments, the electronic document manager 106 may be implemented on a server computer system and may thus service a plurality of users. The electronic document manager 106 may, for example, be implemented on an application server such as International Business Machine's (IBM®'s) WebSphere® Application Server (WAS) that may serve as middleware to set up, operate, and integrate e-business applications across multiple computing platforms using Web technologies. In these embodiments, the user computer systems 102 may typically communicate with the electronic document manager 106 via the Internet (as network 104) and the electronic document database 108 may be implemented on the application server, the user computer system 102, or in a separate storage system. The electronic document manager 106 of these embodiments, may, for example, provide on-line access to electronic documents to subscribers or other authorized users, allowing those authorized users to access electronic documents remotely over the Internet using their browser as a document reader 112.

Example non-limiting embodiments may prove illustrative. In one example, a single user computer system 102 may have a document reader 112 that includes as a plug-in an electronic document manager 106 as well as including an electronic document database 108. In this embodiment, network 104 is not necessary as the components of the electronic document translation system 100 are executing on the same computer system. When the user views a translated electronic document (stored in the electronic document database 108) using their document reader 112, they may select text of the electronic document that they find unclear and then request a reversion to the original language of the text in hopes that they will better understand the meaning of the text in its original language. The electronic document manager 106 may then determine original replacement language for the selected text and then permanently replace the translated text with the original replacement language. The electronic document may then be stored so that when the user accesses the document in the future the selected text will have the original language instead of the translated language.

In another example, the electronic document manager 106 may be executing on a server and communicating with a plurality of user computer systems 102 via the Internet as network 104. In this example, the electronic document manager 106 may manage translated electronic documents (and their original language) in an electronic document database 108 and may provide access to users via a portal- or browser-based interface. A user may use a browser-based document reader 112 to log-in to the electronic document manager 106 and access a particular translated electronic document. If a user requests original language for selected text, such request may be transmitted to the electronic document manager 106 for processing and creation of a new, modified electronic document that has the selected text permanently replaced with the text in the original language. When the user logs-in in the future, they will be presented with the modified electronic document per their preference. In this fashion, the electronic document manager 106 may service a plurality of users each with their own versions of the electronic document.

Figure 2:
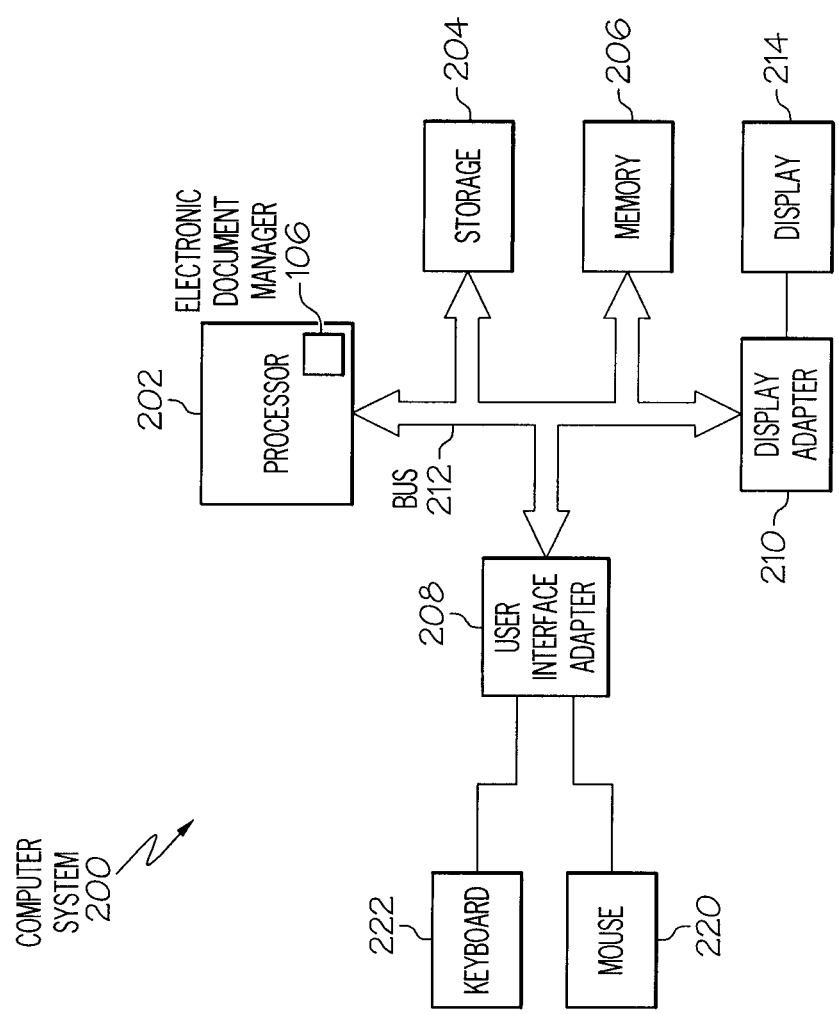
FIG. 2 depicts a block diagram of one embodiment of a computer system suitable for use as a component of the electronic document translation system.

FIG. 2 depicts a block diagram of one embodiment of a computer system 200 suitable for use as a component of the electronic document translation system 100. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200. Computer system 200 may be utilized to implement one or more user computer systems 102, electronic document managers 106, and/or the electronic document database 108.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the electronic document manager 112, such as by selectively modifying an electronic document to revert a user selection of text to its original language, and may temporarily or permanently store information during its calculations or results after calculations in storage 204 or memory 206. All of part of the electronic document manager 112, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a user computer system 102 requesting that selected text be reverted to its original language, for example, may utilize the keyboard 222 and mouse 220 to interact with the computer systems. The bus 212 may also connect the processor 202 to a display, such as an LCD display or CRT monitor, via the display adapter 210.

Figure 3:
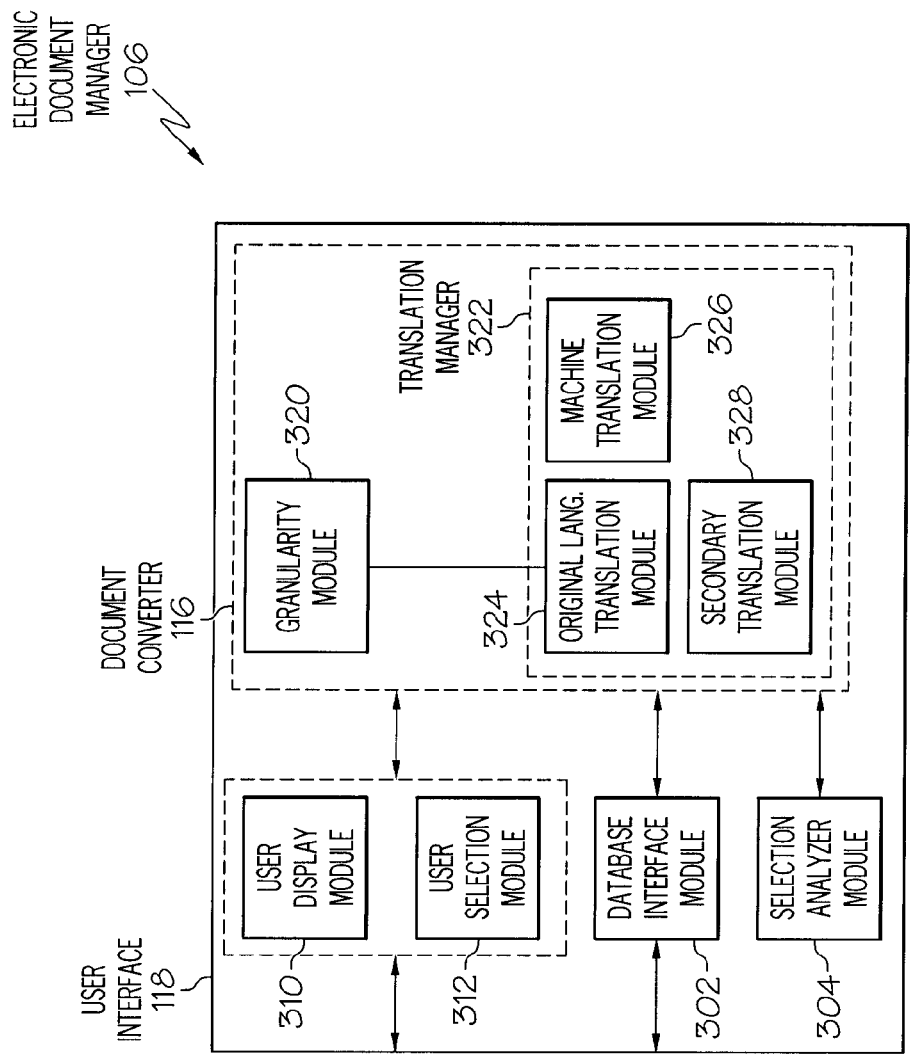
FIG. 3 depicts a conceptual illustration of software components of an electronic document manager according to some embodiments.

FIG. 3 depicts a conceptual illustration of software components of an electronic document manager 106 according to some embodiments. As described previously (and in more detail in relation to FIGS. 5 and 6), the electronic document manager 106 may selectively modify an electronic document to restore portions of translated text to its original language to configure the translations of an electronic document for a particular user. The electronic document manager 106 may include a document converter 116, a user interface 118, a database interface 302, and a selection analyzer module 304.

As described previously, the user interface 118 may receive a request from a user to modify a user selection of text of a translated electronic document to be in the original language instead of the translated language. The user interface 118 may include a user display module 310 and a user selection module 312 to assist it in performance of its functions. The user display module 310 may facilitate display of information to a user using a document reader 112. Displayed information may include a modified electronic document, indications of portions of the document that have been changed to their original text, presentation of options for conversion to the user, presentation of statistical information relating to other user's selections, or other information. The user selection module 312 may receive user requests to convert selected text to its original language, as well as requests to perform other conversions, requests to change the original language back to the translated language, or other information.

As also described previously, the document converter 116 may determine original replacement language associated with the user selection by accessing, for example, a file containing an indication of the original language of the electronic document. The document converter 116 may also selectively modify the electronic document by permanently replacing electronic document text in the second translated language with text in the original language. To accomplish its tasks, the document converter 116 may include a granularity module 320 and a translation manager 322. The granularity module 320 may receive a user selection of text to be converted and to analyze the user selection to determine if an expanded selection of text should be changed into original replacement language. The expanded selection may include at least the original user selection of text and may include additional text in some embodiments. The granularity module 320 may, for example, determine that in the event of three sentences being selected by the user, the entire paragraph including those three sentences should be converted in the interest of clarity. In another example, the granularity module 320 may determine that an entire sentence should be converted when a single word or short phrase is selected, or that words surrounding a particular word should also be converted. In yet another example, the granularity module 320 may determine that the text of a chart be converted when text associated with that chart is selected. In some embodiments, the granularity of a selection may be defined by translators at the time of translation. The granularity module 320 is optional and may be configured by user preference so that the user may specify whether expanded selections are allowed, the aggressiveness of expanding the text, or other factors.

The translation manager 322 of the document converter 116 may perform and manage the conversions of text between the translated language and the original language. The translation manager 322 may include an original language translation module 324, a machine translation module 326, and a secondary translation module 328 to assist it in its tasks. The original language translation module 324 may facilitate converted between the translated language of the electronic document and the original language of the electronic document. In some embodiments, the original language translation module 324 may access an indication of the original language of the electronic document from the electronic document database 108. The indication of the original language may have tags or other mechanisms to associate the original language with the translated language.

The optional machine translation module 326 and secondary translation module 328 may assist in providing alternative translations for the user in addition to the original language and the primary translation of the electronic document. The machine translation module 326 may provide one or more machine-based translations of the original text to present as additional alternatives to the user. Similarly, the secondary translation module 328 may present other translations, such as ones provided by an on-line dictionary, suggested by readers of the electronic document, or other translation sources. In some embodiments, the translations offered by the machine translation module 326 and secondary translation module 328 may be presented to the user in addition to the original language so that the user may select which translation they prefer. In this fashion, the user may select the option that makes the most sense to them to become the new permanent text of the electronic document.

The database interface module 302 may provide for communication to and from the electronic document database 108, thus serving as an interface between the electronic document database 108 and other components of the electronic document manager 106. The database interface module 302 may not be needed when the electronic document database 108 is integrated into the electronic document manager 106.

The selection analyzer module 304 may provide additional functionality by analyzing the selections by a plurality of users to determine the frequency of requests for a particular selection and, in response to determining that the frequency of requests for a particular selection exceeds a threshold, performing a remedial action for the particular selection. Remedial actions may include requesting new translations of the original language, replacing a translation with a user translation or machine translation, or other action. The selection analyzer module 304 may therefore allow a publisher to receive feedback from users identifying problematic text in a translation for quality control tracking so that the problematic text can be corrected. The selection analyzer module 304 may also allow for a user to report a problem with a section of the electronic document and to provide specific feedback regarding their problems with the translation.

FIG. 4 depicts an example of a flow chart 400 for requesting a selective modification to a translated electronic document according to some embodiments. The method of flow chart 400 may be performed, in one embodiment, by components of the electronic document translation system 100 such as the document reader 112. Flow chart 400 begins with element 402, providing access to a translated electronic document to a user utilizing a document reader 112. In some embodiments, authentication of the user may be required before requiring access, such as for electronic documents require purchase or licensing before access.

After the user has access to the electronic document, the method of flow chart 400 may determine at decision block 404 whether the user has requested the original language for a selection of text of the electronic document. If the user has not made such a request, flow chart 400 continues to element 402 for continued access of the electronic document by the user. If the user made such a request, an indication of the request may at element 406 be transmitted to the electronic document manager 106. As described previously, the electronic document manager 106 may be any location, such as in the same user computer system 102 as the document reader 112 or at a distant server connected via the Internet. At element 408, the document reader 112 may receive original replacement language from the electronic document manager 106. The original replacement language may also include other alternative language in addition to the original language according to some embodiments. This may occur, for example, if machine-based translations or alternative user translations are also available in addition to the original language. If, at decision block 410, there are multiple language options for the original replacement language, the document reader 112 may at element 412 present such options to the user and receive a selection by the user from the multiple options. The document reader 112 may present a snippet of text from each alternative translation so that the user can compare them to determine which they prefer. In an alternative embodiment, an indication of which choices were most popular with other users may also be presented if the uses desires such guidance.

After receiving the original replacement language (and any alternatives), the documents reader 112 may at element 414 permanently replace user-selected text of the electronic document with the original replacement language. If the document reader 112 determines at decision block 416 that the original replacement language includes translation of text beyond the user selection of text (such as when the granularity module 320 determines that a wider selection is appropriate), the document reader 112 may also at element 418 replace the appropriate text around the user selection with the associated original replacement language. In this fashion, the selected text (and other text deemed necessary) of the translated electronic document may be permanently replaced. The document reader 112 may at element 420 store the modified electronic document for future use, after which the method may terminate.

FIG. 5 depicts an example of a flow chart 500 for receiving and processing a request for a selective modification to a translated electronic document according to some embodiments. The method of flow chart 500 may be performed, in one embodiment, by components of the electronic document translation system 100 such as the electronic document manager 106. Flow chart 500 begins with element 502, receiving a request from a user to view a user selection of text of an electronic document in an original language instead of a translated language for an electronic document having substantially all of its text in the translated language. In some embodiments, the electronic document manager 106 may receive such a request from a document reader 112.

After receiving the request, the electronic document manager 106 may at element 504 analyze the request to determine the expanded selection to be changed into original replacement language. At described previously, the expanded selection may include at least the user selection of text and may include additional text deemed beneficial in clarifying the electronic document. At element 506, the electronic document manager 106 may determine original replacement language associated with the determined expanded selection by accessing, for example, an indication of the original replacement language stored in the electronic document database 108.

The electronic document manager 106 may also optionally determine if alternative replacement language will also be used in addition to the original language. If there are additional options at decision block 508, the electronic document manager 106 may determine at decision block 510 whether a dictionary look-up is an alternative. If so, the electronic document manager 106 may at element 512 determine a new translation of the expanded selection based on an on-line or other electronic dictionary. Similarly, the electronic document manager 106 may determine at decision block 514 whether any other alternative translations will be used. If so, it may determine the new translation at element 516 based on the alternative sources, such as by accessing an alternative human translation, requesting a machine-translation, or other action. At element 518, the electronic document manager 518 may determine new replacement language based on any alternative translations determined at elements 510 or 516.

The electronic document manager may, at element 520, transmit the original replacement language (and optionally any new replacement language that is part of the original replacement language) to the document reader 112 for handling as described in relation to FIG. 4. At optional element 522, the electronic document manager 106 may store an indication of the original or new replacement language for future reference. If, for example, the electronic document is accessible on-line, new replacement language may be stored so that the future accesses of the electronic document by the user reflect that user's choices of language. In another example, a new version of the electronic document particular to that user may be stored with the permanent changes in language included. An indication of the user selection for original language may also be stored at element 524, after which method 500 may terminate. Such an indication may be used for statistical analysis of user selections to improve the electronic document, as will be described in more detail in relation to FIG. 6.

FIG. 6 depicts an example of a flow chart 600 for analyzing user selections of text to be converted to original language according to some embodiments. The method of flow chart 600 may be performed, in one embodiment, by components of the electronic document manager 106 such as the selection analyzer module 304. Flow chart 600 begins with element 602, accessing stored indications of user selections of a translated electronic document to have its original language restored. After accessing the stored indications, the selection analyzer module 304 may analyze the selections of the plurality of users to determine the frequency of requests for a particular selection (e.g., word, phrase, sentence, paragraph, page, section, chapter, etc.).

For each selection, the selection analyzer module 304 may determine at decision block 606 whether the frequency of requests for a particular selection exceed a threshold. The threshold may be a specified number of requests, a percentage of users, or any other metric, and may be specified by a publisher or other document owner in some embodiments. If the frequency of requests does exceed the threshold, a remedial action may be performed for the selection, such as by requesting a new human translation, modifying the translated electronic document to improve the translation, or other action. If, at decision block 610, there are more requested selections, the method may return to element 606 for additional analysis, so that the entire electronic document may be analyzed.

At element 612, the selection analyzer module 304 may determine the results of any remedial action for selections over the threshold and may, at element 614, store the results of such remedial actions. If, for example, the translation of a particular chapter of an on-line electronic document was improved, the stored version of that electronic document may be modified with updated text. At element 616, any results of the remedial action may optionally be transmitted, such as by sending out updates to electronically-distributed electronic documents that have already been disseminated to users. The method may terminate after handling the results of any remedial actions. The method of FIG. 6 may thus allow for a publisher or other electronic document owner to improve their document by correcting the translation of any sections that are frequently requested to be restored to their original language, as such requests may provide a strong indication that the translation is currently unclear to readers.

It will be apparent to those skilled in the art having the benefit of this disclosure that the present invention contemplates methods, systems, and media for selectively modifying an electronic document by restoring user-selected portions of translated electronic document text to their original language. It is understood that the form of the invention shown and described in the detailed description and the drawings are to be taken merely as examples. It is intended that the following claims be interpreted broadly to embrace all the variations of the example embodiments disclosed.

What is claimed is:

1. A method for selectively modifying an electronic document, the method comprising:
   receiving a request from a user to view a user selection of text of an electronic document in an original language instead of a second translated language, the electronic document having substantially all of its text in the second translated language;
   analyzing the request to determine an expanded selection to be changed into original replacement language, with the analyzing step including the substep of deciding the amount of text to modify, the expanded selection including at least the user selection;
   determining original replacement language associated with the determined expanded selection;
   selectively modifying the electronic document by choosing text that best communicates the meaning of the associated original replacement language, and by permanently replacing text of the electronic document in the second translated language with chosen text that communicates the meaning of the associated original replacement language; and
   storing the modified electronic document.

2. The method of claim 1, further comprising before receiving the request from the user, providing access to the electronic document in a document reader.

3. The method of claim 1, further comprising:
   wherein the original replacement language comprises one or more alternative translations;
   receiving an indication from the user of a preference for a particular alternative translation; and
   wherein selectively modifying the electronic document comprises permanently replacing text of the electronic document in the second translated language with text from the particular alternative translation.

4. The method of claim 3, wherein at least one of one or more alternative translations is a dictionary look-up translation.

5. The method of claim 1, further comprising:
   storing an indication of selections requested to have original replacement language by a plurality of users;
   analyzing the selections by the plurality of users to determine frequency of requests for a particular selection; and
   in response to determining that the frequency of requests for the particular selection exceeds a threshold, performing a remedial action for the particular selection.

6. The method of claim 5, further comprising determining results for remedial actions for any particular selections over the threshold and storing the results.

7. The method of claim 1, wherein the expanded selection comprises additional text adjacent the text of the user selection.

8. The method of claim 1, wherein the expanded selection includes only the text of the user selection.

9. A computer program product comprising one or more computer-readable, tangible storage devices and computer-readable program instructions which are stored on the one or more storage devices and when executed by one or more processors, perform the method of claim 1.

10. A computer system comprising one or more processors, one or more computer-readable memories, one or more computer-readable, tangible storage devices and program instructions which are stored on the one or more storage devices for execution by the one or more processors via the one or more memories and when executed by the one or more processors perform the method of claim 1.

11. A computer program product for selectively modifying an electronic document, the computer program product comprising:
    one or more computer-readable, tangible storage devices;
    program instructions, stored on at least one of the one or more storage devices, to receive a request from a user to view a user selection of text of an electronic document in an original language instead of a second translated language, the electronic document having substantially all of its text in the second translated language;
    program instructions, stored on a least one of the one or more storage devices, to analyze the request to determine an expanded selection to be changed into original replacement language, and to decide on the amount of text to modify, the expanded selection including at least the user selection;
    program instructions, stored on at least one of the one or more storages devices, to determine original replacement language associated with the determined expanded selection;
    program instructions, stored on a least one of the one or more storage devices, to choose text that best communicates the meaning of the associated original replacement language, and to selectively modify the electronic document by permanently replacing text of the electronic document in the second translated language with chosen text that communicates the meaning of the associated original replacement language; and
    program instructions, stored on at least one of the one or more storage devices, to store the modified electronic document.

12. The computer program product of claim 11, further comprising program instructions, stored on at least one of the one or more storage devices, to provide access to the electronic document in a document reader before performing the program instructions to receive the request from the user.

13. The computer program product of claim 12, further comprising:
    wherein the original replacement language comprises one or more alternative translation;
    program instructions, stored on at least one of the one or more storage devices, to receive an indication from the user of a preference for a particular alternative translation; and
    wherein the program instructions to selectively modifying the electronic document comprises program instructions to permanently replace text of the electronic document in the second translated language with text from the particular alternative translation.

14. The computer program product of claim 11, further comprising:
    program instructions, stored on at least one of the one or more storage devices, to store an indication of selections requested to have original replacement language by a plurality of users;

program instructions, stored on at least one of the one or more storage devices, to analyze the selections by the plurality of users to determine frequency of requests for a particular selection; and program instructions, stored on at least one of the one or more storage devices, in response to the program instructions to determining that the frequency of requests for the particular selection exceeds a threshold, to performing a remedial action for the particular selection.

15. The computer program product of claim 11, wherein the expanded selection comprises additional text adjacent the text of the user selection.

16. The computer program product of claim 11, wherein the expanded selection includes only the text of the user selection.

17. A computer system for selectively modifying an electronic document, the system comprising:

one or more processors, one or more computer-readable memories and one or more computer-readable, tangible storage devices;

program instructions, stored on at least one of the one or more storage devices for execution by at least one of the one or more processors via at least one of the one or more memories, to receive a request from a user to view a user selection of text of an electronic document in an original language instead of a second translated language, the electronic document having substantially all of its text in the second translated language;

program instructions, stored on at least one of the one or more storage devices for execution by at least one of the one or more processors via at least one of the one or more memories, to analyze the request to determine an expanded selection to be changed into original replacement language, and to decide on the amount of text to modify, the expanded selection including at least the user selection;

program instructions, stored on at least one of the one or more storage devices for execution by at least one of the one or more processors via at least one of the one or more memories, to determine original replacement language associated with the determined expanded selection;

program instructions, stored on at least one of the one or more storage devices for execution by at least one of the one or more processors via at least one of the one or more memories, to choose text that best communicates the meaning of the associated original replacement language, and to selectively modify the electronic document by permanently replacing text of the electronic document in the second translated language with chosen text that communicates the meaning of the associated original replacement language; and program instructions, stored on at least one of the one or more storage devices for execution by at least one of the one or more processors via at least one of the one or more memories, to store the modified electronic document.

18. The system of claim 17, further comprising program instructions, stored on at least one of the one or more storage devices for execution by at least one of the one or more processors via at least one of the one or more memories, to provide access to the electronic document in a document reader before performing the program instructions to receive the request from the user.

19. The system of claim 17, further comprising:

wherein the original replacement language comprises one or more alternative translations;

program instructions, stored on at least one of the one or more storage devices for execution by at least one of the one or more processors via at least one of the one or more memories, to receive an indication from the user of a preference for a particular alternative translation; and wherein the program instructions to selectively modify the electronic document comprises program instructions to permanently replace text of the electronic document in the second translated language with text from the particular alternative translation.

20. The system of claim 17, further comprising:

program instructions, stored on at least one of the one or more storage devices for execution by at least one of the one or more processors via at least one of the one or more memories, to store an indication of selections requested to have original replacement language by a plurality of users;

program instructions, stored on at least one of the one or more storage devices for execution by at least one of the one or more processors via at least one of the one or more memories, to analyze the selections by the plurality of users to determine frequency of requests for a particular section; and in response to the program instructions to determine that the frequency of requests for the particular section exceeds a threshold, program instructions, stored on at least one of the one or more storage devices for execution by at least one of the one or more processors via at least one of the one or more memories, to perform a remedial action for the particular selection.

21. The system of claim 20, further comprising program instructions, stored on at least one of the one or more storage devices for execution by at least one of the one or more processors via at least one of the one or more memories, to determine results for remedial actions for any particular selections over the threshold and to store the results.

22. The system of claim 17, wherein the expanded selection comprises additional text adjacent the text of the user selection.

* * * * *